April 3, 1951  H. WYDLER  2,547,301
FLOWMETER WITH PISTONS
Filed Sept. 27, 1946  5 Sheets-Sheet 1

Inventor
H. Wydler
By Glascock Downing Riehl
Attys.

April 3, 1951      H. WYDLER      2,547,301
FLOWMETER WITH PISTONS

Filed Sept. 27, 1946      5 Sheets-Sheet 3

Inventor
H. Wydler
By Glascock Downing Tuttle
Attys.

April 3, 1951 H. WYDLER 2,547,301
FLOWMETER WITH PISTONS
Filed Sept. 27, 1946 5 Sheets-Sheet 4
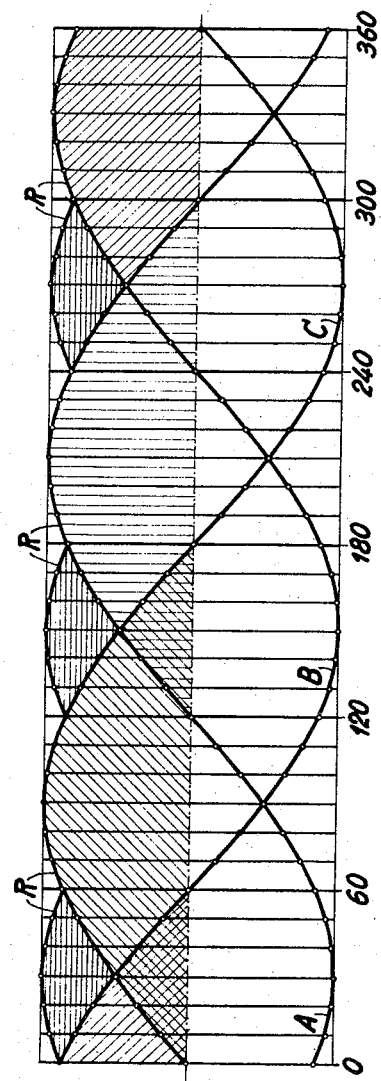
Fig.9
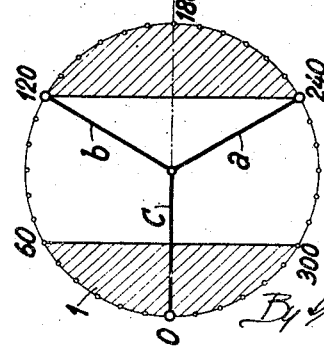
Inventor
H. Wydler Patented Apr. 3, 1951

2,547,301

UNITED STATES PATENT OFFICE 2,547,301

FLOWMETER WITH PISTONS

Hermann Wydler, Berne, Switzerland, assignor to Stoppani A. G., Berne, Switzerland, a joint-stock company of Switzerland Application September 27, 1946, Serial No. 699,754
In Switzerland October 5, 1946

6 Claims. (Cl. 73—242)

The present invention relates to a flow meter with pistons, the totalizer of which is driven through the medium of a crank mechanism.

Such meters are used, for example, to pour out and measure liquid fuel. Those used up to the present day possess certain inherent imperfections originating in the fact that the crank mechanism is constructed of a crank whose angle of rotation is not proportional to the piston stroke and consequently, to the position of the totalizer pointer. Methods have been devised to obviate these inherent imperfections by arranging a number of pistons working out of phase with one another. The choice of an uneven number of pistons has the advantage that the said imperfections are not greater than with an even number of double pistons. Another cause of these imperfections is the fact that a crank rod of some definite length is usually employed. Further, losses due to pressure necessary in the operation of the meter must be taken into account, specially those due to the system of control of the inlet and outlet to and from the measuring chambers.

The aim of the invention is to produce a flow meter in which the above mentioned imperfections may be reduced to a minimum. This is obtained in the present invention by the use of two pistons working in three measuring chambers. These two pistons can, moreover, serve as a system of control of the inlet and outlet to and from the measuring chambers.

To this end, they receive only lengthwise motion, but in addition oscillatory rotary motion. A still further advantage of this meter lies in the fact that only two cylinder bores need be provided, with sufficient room for two pistons. Inaccuracy due to an even number is thereby no greater than in the case of three pistons.

The attached drawing shows, by way of example, an embodiment of the invention.

Fig. 9 shows the inlet and outlet control and output-diagrams of the meter.

The space developed by the area of the piston-head during one stroke within the cylinder bore is called in flow meters a measuring chamber. A liquid flowing from a tank (e. g. a petrol tank) during a certain time can be measured by the addition of the number of contents of the measuring chambers poured out, whereby the last stroke of the pistons may be incomplete. In practice, the total contents of liquid can be measured by means of a totalizer. But this is only possible on the condition that the rate of counting is proportional to the contents of the measuring chambers flowing through the meter per unit of time. As already mentioned, this is only approximately made possible by the use of several pistons. The following example illustrates how, according to the method characterising the present invention, this result can be most accurately and easily obtained.

Fig. 9 represents diagrammatically the circle through which the cranks move in the case of three pistons working with a difference of phase of 120° between one another. The radius of each crank is designated by $a$, $b$ and $c$, respectively. The diagram on the right hand side of Fig. 9 represents the momentary output curves of the three pistons for different angles of rotation during one turn of the crank. The ordinate $y$ usually represents the magnitude of output in volume for different momentary positions of a crank along the circle of rotation. Now, by moving one crank through 360° along the circle of rotation in the clockwise direction, the sine curve A of the output diagram can be constructed. The same is to be said of the cranks $b$ and $c$, giving rise to sine curves B and C, respectively. By adding the momentary output represented by the points on the curves A and B algebraically, the resultant will be found to correspond to the ordinate $y$ of the curve C, but with a negative sign. This means that the algebraical addition of the capacities of symmetrical cylinder portions at the opposite end of the pistons to which two of the measuring chambers correspond, pistons, say, controlled by the cranks a and b, is equal to the capacity of the third cylinder, so that the third piston with crank c can be left away, as long as the two other above mentioned cylinder portions communicate so as to form a third measuring chamber. In this manner, a flow meter can be constructed with two pistons working in three measuring chambers.

The resultant output curve R of the meter, i. e. the resulting momentary output in function of the angle of rotation of the cranks, is obtained by addition of the positive ordinates $y$ in the output diagram lying above points along the abscissa. It can be seen that the curve R takes the approximate form of a horizontal straight line, which means that the imperfections are small. Experiment has shown that these imperfections are smaller than in any other known method.

Figure 5:
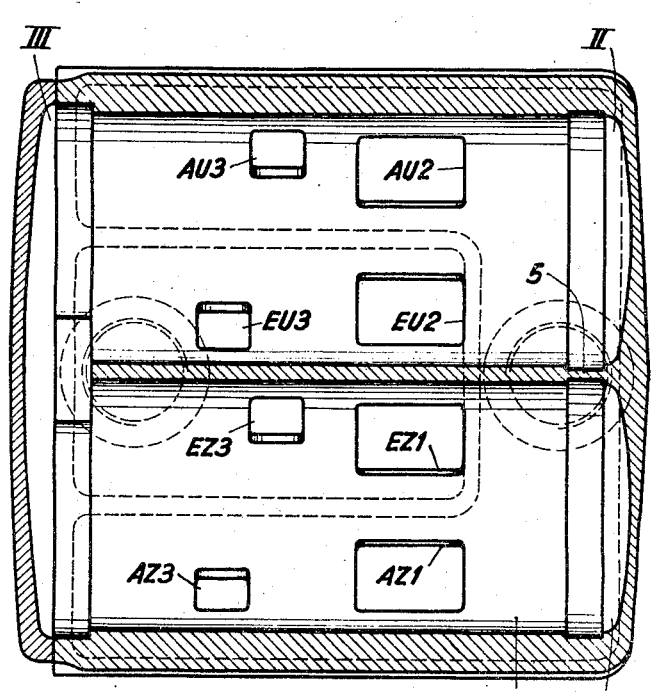
Fig. 5 is a section through the axes of both cylinder bores with the pistons taken away.

The constructional design of the flow meter is illustrated in Figs. 1 to 8. It can be seen from Fig. 1 that the cylinder block 2 contains two parallel cylinder bores 3 and 4 in which the pistons $ka$ and $kb$ can move. Fig. 5 shows a sectional view of the block through the axes of the two cylinder bores 3 and 4, so that the manner in which the three measuring chambers are constructed is made visible. The ends of the cylinders on the left hand side of the figure communicate to form the third measuring chamber III, whereas the cylinder portions on the right hand side of the figure are closed by a wall 5 to form the measuring chambers I and II.

Figure 1:
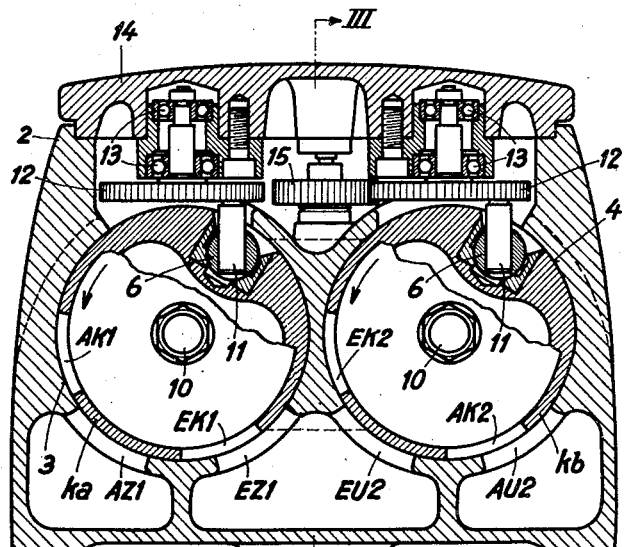
Fig. 1 is a cross section of the meter with respect to the axis of the pistons, along the line I—I in Fig. 2.
Figure 6:
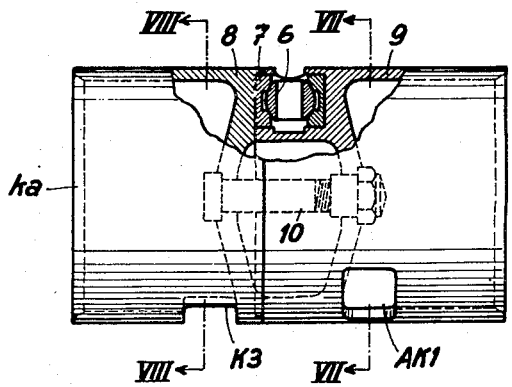
Fig. 6 is a longitudinal view of one of the pistons, partly in section.
Figures 7, 8:
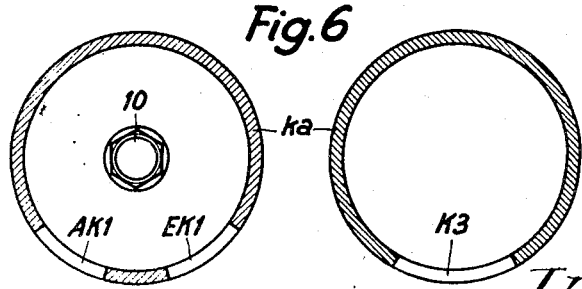
Figs. 7 and 8 are cross-sections along the lines VII—VII and VIII—VIII, respectively, in Fig. 6, showing the inlet and outlet control slots of the pistons.
Figure 3:
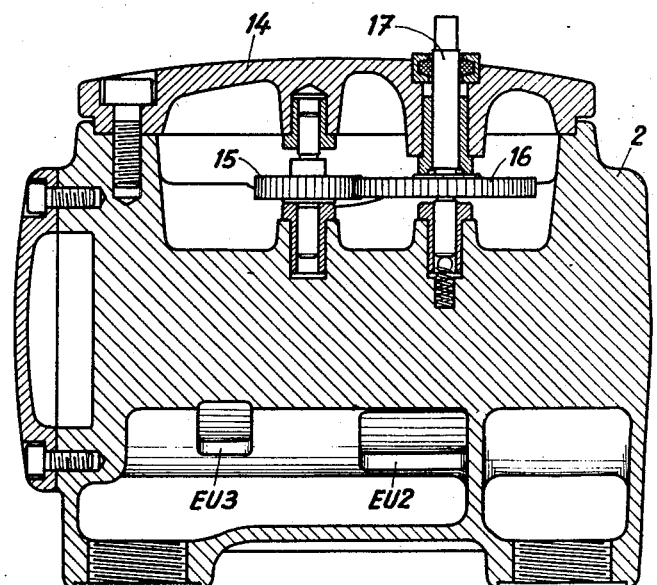
Fig. 3 is a section along the line III—III in Fig. 1.
Figure 2:
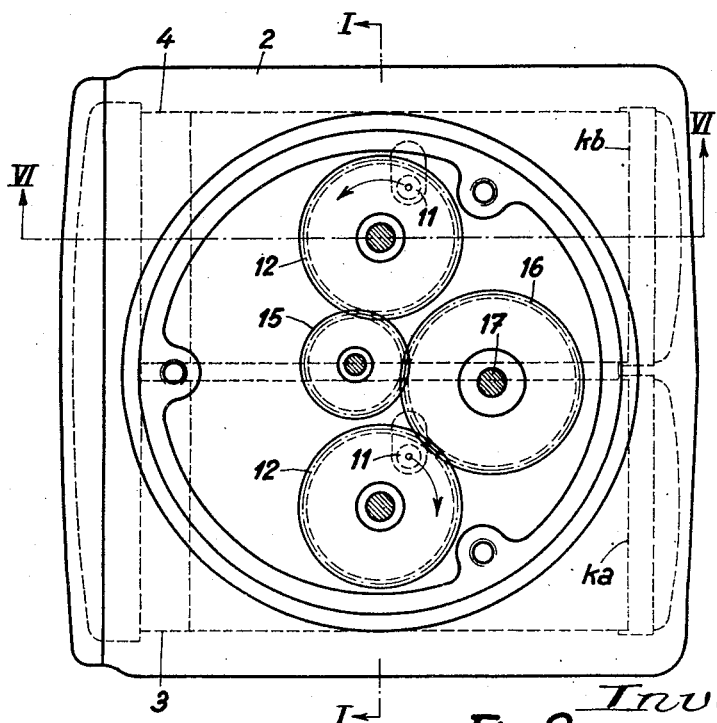
Fig. 2 is a plan view of the same with the cover taken away, so as to show the crank mechanism and gears driving the totalizer train.
Figure 4:
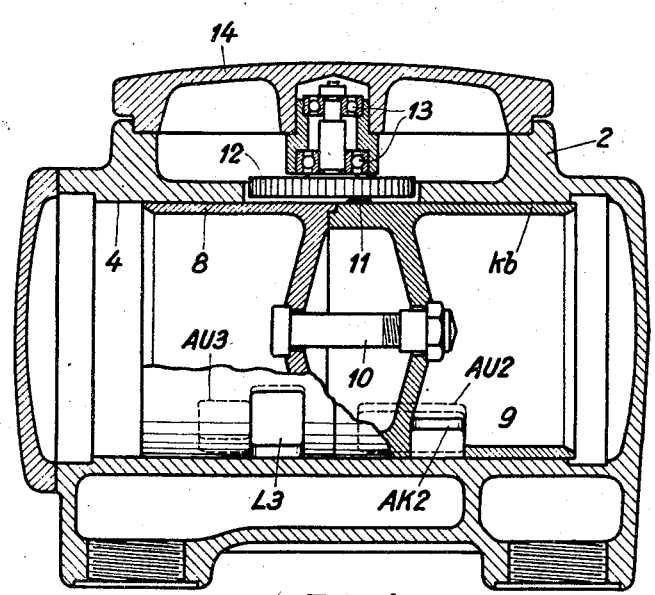
Fig. 4 is a longitudinal section through one of the pistons along the line IV—IV in Fig. 2.

The two pistons $ka$ and $kb$ control the inlet and outlet to and from the three measuring chambers I, II and III. To this end an oscillatory rotary motion is imparted to the pistons in addition to the reciprocating motion given by the liquid flowing through the chambers. This is done by means of a crank mechanism operating both pistons and which transmits its motion to a totalizer train, not represented, in the following way: A ball 6 is movable in a socket 7 provided between the halves 8 and 9 of each piston, the two halves being held together by means of screw-bolts 10 (Fig. 6). This ball 6 carries a pivot 11 projecting from a connecting disc in the form of a gear wheel 12. The latter is carried in ball bearings 13 mounted in the cover 14 fitting over the block 2. It can be seen that on each stroke of the pistons $ka$ and $kb$, the gear wheels 12 will be caused to turn through the medium of the ball pivots 11. These wheels will consequently impart an oscillatory motion to the pistons. Moreover, the length of the connecting medium is endless, with the result that inaccuracy due to a definite length of connecting rod is obviated. The one of the wheels 12 driven by the piston $ka$ meshes directly with the wheel 16 connecting the apparatus through the axle 17 to the totalizer train, whereas the other wheel 12 driven by the piston $kb$ is likewise connected to the wheel 16 through the medium of an intermediate wheel 15. The connecting discs 12 turn in an opposite direction to each other. In this way it is not necessary to interchange the positions of the inlet and outlet slots of the pistons.

Each of the pistons $ka$ and $kb$ has three slots. Two are of the same size and lie within two same parallel circles. One of them EK1 or EK2 serves as an inlet for the liquid to the measuring chamber I or II, respectively, the other AK1 or AK2, as an outlet from the chamber I or II, respectively. The third slot K3 or L3, in the pistons $ka$ or $kb$, respectively, cooperating with the slots EK1, AK1, or EK2, AK2, respectively, is axially displaced with respect to these latter slots and serves as an inlet and outlet to and from the measuring chamber III. Each of the two cylinder bores are provided with four openings, e. g. the cylinder bore 3 with an inlet EZ1 and outlet AZ1 of the same size and lying within two same parallel circles, both communicating with the measuring chamber I, and an inlet EZ3 and outlet AZ3 communicating with the chamber III. The latter are displaced axially one with respect to the other. The cylinder bore 4 is provided with corresponding openings, namely an inlet EU2 and outlet AU2 communicating with the measuring chamber II, both openings being likewise of the same size and lying within two same circles, and an inlet EU3 and outlet AU3 communicating with the measuring chamber III, the latter openings being also axially displaced with respect to each other. The above named openings in the cylinder bores and pistons are so arranged that they cooperate according to some adequate rhythm under the influence of the combined linear and oscillatory motion of the pistons. This rhythm is obtained by arranging the openings with reference to Figs. 9 and 10 in the following manner.

Figure 10:
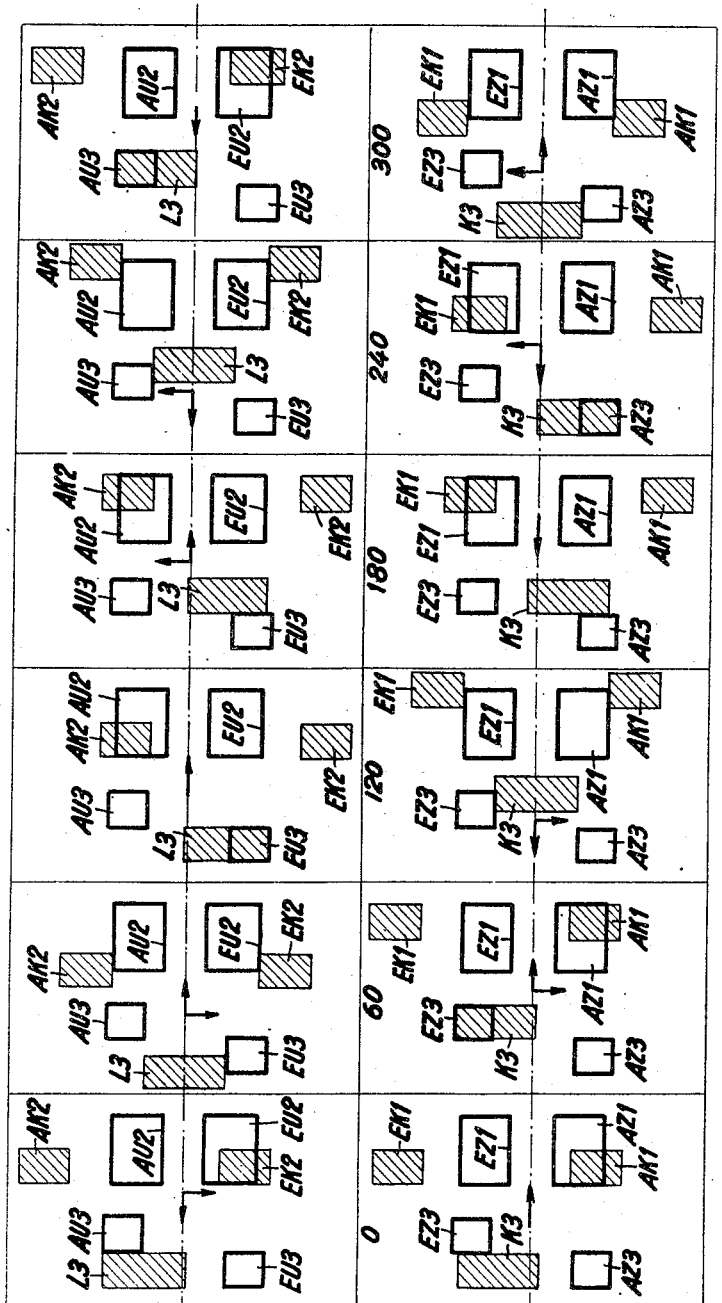
Fig. 10 illustrates schematically the relative positions of the inlet and outlet control slots, and of the measuring chambers, in six different positions of the pistons, corresponding to six positions of the crank at intervals of 60° along the crank circle.

In Fig. 10, the relative positions of the slots in the cylinder bores and piston walls are shown in six phases at intervals of 60° along the crank circle. These intervals are designated by 0, 60, 120, 180, 240 and 300 on the crank circle in Fig. 9, and correspond to the six phases designated by the same numerals in Fig. 10. A horizontal line divides each phase diagram in two, representing, below the line, the relative positions of the openings in the piston $ka$ and the cylinder bore 3 and, above the line, of the pistons $kb$ and the cylinder bore 4.

In position 0 all the inlets and outlets to and from chamber III are closed and the cranks $a$ and $b$ lie symmetrical to the horizontal through the centre of the crank circle, i. e. in this position the two pistons lie level with each other. The outlet AK1 from chamber I is open through the slot AZ1, i. e. in this position piston $ka$ is about to expel the liquid from chamber I. The inlet EK2/EU2 of chamber II is open, so that the latter will be filled. On passing from phase 0 to the next phase, chamber III begins to fill through the ports K3/EZ3, under the action of the piston $ka$.

In position 60 the latter port is wide open, but no liquid can as yet pass through the piston $kb$, i. e. through the port L3/EU3, into chamber III. Chamber I is still being emptied through port AZ1/AK1, whereas the inlet and outlet to and from chamber II are closed. On passing from phase 60 to the next phase, the inlet to chamber III begins to open under the influence of the piston $kb$, whereas the inlet to chamber III begins to close under the influence of the piston, $ka$.

In position 120 the latter is completly closed and the inlet port L3/EU3 is wide open under the influence of the piston $kb$. In this position, the inlet and outlet, i. e. EK1/EZ1 and AK1/AZ1, respectively, to and from chamber I are completely shut. Chamber II is about to empty through the open port AK2/AU2. On passing from phase 120 to the next phase, the inlet L3/EU3 to chamber III begins to close and in position 180 chamber III is completely shut. In this way the chamber III was filled during a half turn of the crank. Simultaneously, the chamber II filled on passing from phase 0 to 60 and the chamber I, from phase 120 to 180. This can be seen from the curves A, B and C in Fig. 9. On passing from phase 180 to the next phase, chamber III begins to empty, but first of all through the piston $ka$ by the port K3/AZ3.

In position 240 the latter port is wide open, whereas the outlet L3/AU3 from chamber III through the piston $kb$ will shortly begin to open. Chamber I in this phase is still being filled through the inlet EKI/EZI. Chamber II is closed.

On passing from phase 240 to the next phase, the outlet K3/AZ3 from chamber III through piston $ka$ begins to close and the outlet L3/AU3 through piston $kb$ to open.

In position 300 the outlet K3/AZ3 from chamber III through piston $ka$ is completely closed, whereas the outlet L3/AU3 through piston $kb$ is wide open. Now chamber I is closed. Chamber II is about to fill through the inlet port EK2/EU2. On passing from phase 300 to the next phase, the outlet L3/AU3 from chamber III through piston $kb$ begins to close until the original position 0 is gained, when the cycle of phases repeats itself. Again it can be seen from the curves A, B, and C in Fig. 9, that during the time that chamber III (curve C) empties, i. e. during phases 180 to 0, chamber I (curve A) and chamber II (curve B) fill between phases 180 to 300 and 240 to 0, respectively.

What I claim is:

1. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders and control openings in the walls of said pistons, and means for causing oscillation of said pistons to change the mutual position of said control ports and said control openings to control the inlet and outlet to and from said three measuring chambers.

2. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, the capacity of said common measuring chamber being equal to the algebraical addition of the capacities of said two separate measuring chambers, there being control ports in the walls of said cylinders and control openings in the walls of said pistons for cooperation with said control ports, and means for causing oscillation of said pistons to change the mutual position of said control ports and said control openings to control the inlet and outlet to and from said three measuring chambers and for making said two pistons work at a difference of phase of 120°.

3. In a flow meter, two cylinders lying side by side with their interiors permanently connected with each other at their one end, two rotatable and axially movable pistons, one in each of said cylinders, thus forming a measuring chamber in said cylinders, common to both pistons and limited by the piston ends turned towards the mutual connection of said cylinder interiors, and two separate measuring chambers in said cylinders at the other end of said pistons, there being control ports in the walls of said cylinders and control openings in the walls of said pistons, a totalizer-driving crank mechanism comprising rotatable connecting discs, pins fixed to said connecting discs with their axes parallel to the axes of rotation of said connecting discs, balls receiving said pins, pivotally mounted on said pistons to drive said connecting discs on axial movement of said pistons and to oscillate at the same time said pistons to change the mutual position of said control ports and said control openings to control the inlet and outlet to and from said three measuring chambers.

4. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the wall of the said cylinders and control openings in the walls of said pistons, a totalizer train, a totalizer-driving crank mechanism comprising gear wheels in connection with said totalizer train, pins fixed to said gear wheels with their axes parallel to the axes of rotation of said gear wheels, balls receiving said pins, pivotally mounted on said pistons to drive said gear wheels on axial movement of said pistons and to oscillate at the same time said pistons to change the mutual position of said control ports and said control openings to control the inlet and outlet to and from said three measuring chambers.

5. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders and control openings in the walls of said pistons, a totalizer train, an intermediate gear meshing with said totalizer train, a totalizer-driving crank mechanism comprising two gear wheels, the one meshing with said totalizer train, the other with said intermediate gear, pins fixed to said gear wheels with their axes parallel to the axes of rotation of said gear wheels, balls receiving said pins, pivotally mounted on said pistons to drive said gear wheels on axial movement of said pistons and to oscillate at the same time said pistons to change the mutual position of said control ports and said control openings to control the inlet and outlet to and from said three measuring chambers.

6. In a flow meter, two cylinders lying side by side with their interiors permanently connected with each other at their one end, two rotatable and axially movable pistons, one in each of said cylinders, thus forming a measuring chamber in said cylinders, common to both pistons and limited by the ends of said pistons turned towards the mutual connection of said cylinder interiors, and two separate measuring chambers in said cylinders at the other end of said pistons, there being control ports in the walls of said cylinders and control openings in the walls of said pistons, a totalizer-driving crank mechanism comprising two rotatable discs rotatable in an opposite direction to each other, pins fixed to said connecting discs with their axes parallel to the axes of rotation of said connecting discs, balls receiving said pins, pivotally mounted on said pistons to drive said connecting discs on axial movement of said pistons and to oscillate at the same time said pistons to change the mutual position of said control ports and said control openings to control the inlet and outlet to and from said three measuring chambers.

HERMANN WYDLER.

REFERENCES CITED

The following references are of record in the file of this patent:

UNITED STATES PATENTS

| Number | Name | Date |
|---|---|---|
| 722,390 | Sprague | Mar. 10, 1903 |
| 1,583,040 | Wunsch | May 4, 1926 |
| 1,811,789 | Granberg | June 23, 1931 |
| 2,399,316 | Berck | Apr. 30, 1946 |

FOREIGN PATENTS

| Number | Country | Date |
|---|---|---|
| 763,563 | France | Feb. 12, 1934 |